United States Patent [19]

Tanaka

[11] Patent Number: 5,023,188

[45] Date of Patent: Jun. 11, 1991

[54] METHOD OF DETERMINING THE DEPTH OF TRENCHES FORMED IN A SEMICONDUCTOR WAFER

[75] Inventor: Hiroshi Tanaka, Itami, Japan

[73] Assignee: Mitsubishi Denki Kabushiki Kaisha, Japan

[21] Appl. No.: 279,722

[22] Filed: Dec. 5, 1988

[30] Foreign Application Priority Data

Jul. 13, 1988 [JP] Japan ............................ 63-172644

[51] Int. Cl.$^5$ ...................... G01R 31/26; H01L 21/66
[52] U.S. Cl. .......................................... 437/8; 437/65; 437/228; 156/626
[58] Field of Search ............................ 437/8, 65, 228; 156/626, 643

[56] References Cited

U.S. PATENT DOCUMENTS

| 4,367,044 | 1/1983 | Booth, Jr. et al. | 356/357 |
| 4,611,919 | 9/1986 | Brooks, Jr. et al. | 356/357 |
| 4,838,694 | 6/1989 | Betz et al. | 356/357 |

FOREIGN PATENT DOCUMENTS 60-86833  5/1985  Japan .
63-175703 7/1988  Japan .

OTHER PUBLICATIONS

Kleinknecht et al., J. Electrochem. Soc.: Solid State Science and Technology, v. 125, No. 5 (May 1978), pp. 799–803.

Primary Examiner—Olik Chaudhuri
Assistant Examiner—George R. Fourson
Attorney, Agent, or Firm—Leydig, Voit & Mayer

[57] ABSTRACT

In a process for forming trenches in a semiconductor substrate wafer, first trenches are formed in a surface portion of the semiconductor substrate wafer and, at the same time, a plurality of second trenches are formed in a predetermined section of the surface portion such that the area ratio of the second trenches to the portions between the second trenches of the predetermined section may be a predetermined value. Then, a measuring light is irradiated on the predetermined section and the depth of the second trenches is measured on the basis of the intensity of light reflected from the predetermined section to thereby obtain the depth of the first trenches. Thus, the first trenches having a predetermined depth are formed in the surface portion of the semiconductor substrate wafer. This process makes it possible to form trenches in a semiconductor substrate wafer with high precision.

9 Claims, 7 Drawing Sheets

METHOD OF DETERMINING THE DEPTH OF TRENCHES FORMED IN A SEMICONDUCTOR WAFER

BACKGROUND OF THE INVENTION

1. Field of the Invention

The present invention relates generally to a process for forming trenches in a semiconductor wafer and, more particularly, to a process for forming, with high precision, the trenches required to form various devices on a semiconductor wafer.

2. Description of the Related Art

In a typical semiconductor fabrication process, a plurality of trenches are formed in each semiconductor wafer, which are substrates of semiconductor devices. The pattern of the trenches is determined by the circuit design of the semiconductor devices to be produced. Such trenches, which are required to form, for example, separate transistor cells or capacitor cells, constitute an important constituent element which influences the basic characteristics of each device to be formed on the semiconductor wafer.

FIG. 1 is a top plan view showing the essential portion of a conventional semiconductor substrate wafer 10. A multiplicity of functional-pattern forming regions 1 which, in a subsequent step, will be cut into individual semiconductor chips are arranged over the single semiconductor substrate wafer 10 in orderly fashion. Each of the functional-pattern forming regions 1 has a trench forming section 2 which is provided for the purpose of forming the trenches required to form various kinds of devices and a marginal-pattern forming section 3 which is defined along the entire periphery of the trench forming section 2 so that electrodes and their associated elements may be formed thereon. The portions between adjacent functional-pattern forming regions 1 are called dicing lines 4. After various elements comprising a semiconductor chip have been formed in each of the functional-pattern forming regions 1, the semiconductor wafer 10 is cut into individual chips along the dicing lines 4.

As shown in FIGS. 2 and 3, trenches 5 are formed in the trench forming section 2. The trenches 5 constitute a pattern corresponding to individual devices which are to be formed in the trench forming section 2. Each of the trenches 5 has a cross-sectional shape such as that shown in FIG. 4.

Normally, such a trench 5 is formed by etching and it is necessary, therefore, to determine whether or not etching has reached a predetermined depth which represents the end of a trench-forming operation. A typical method of determining the end of a trench-forming operation is measurement of the fluctuations in the quantity of interfering light by using, for example, the apparatus shown in FIG. 5. In the illustrated apparatus, a semiconductor substrate wafer 10 is carried on a lower electrode 12 disposed in an etching chamber 11, and a through hole 13a is formed in an upper electrode 13 in the direction parallel to the optical axis of coherent light 18. The coherent light 18 which is emitted from a position above the etching chamber 11 irradiates a portion of the trench forming section 2 of the semiconductor substrate wafer 10 through the through hole 13a. The coherent light 18 is emitted from a light source 14 disposed at a position above the etching chamber 11 and is perpendicularly projected onto the semiconductor substrate wafer 10 via a spectroscopic prism 16 within a spectroscope 15.

Then, the coherent light 18 is reflected by the irradiated portion of a surface of the semiconductor substrate wafer 10. However, since the trenches 5 are formed in the surface portion of the semiconductor substrate wafer 10 as shown in FIG. 4, reflection of the coherent light 18 occurs on both a bottom surface 5b in the trench 5 and a surface 5a of an area between the trenches 5 (non-trenched surface). More specifically, as shown in FIG. 6, light 19a reflected from the non-trenched surface 5a of the semiconductor substrate wafer 10 and light 19b reflected from the bottom surface 5b in the trench 5 interfere with each other to form zero order diffracted light. The zero order diffracted light is made incident upon a light receiver 17 through the spectroscopic prism 16 in the spectroscope 15.

The phase difference between the reflected light rays 19a and 19b changes in accordance with the depth of the trench 5. It is possible, therefore, to detect the depth of the trench 5 by measuring the intensity of the zero order diffracted light with the light receiver 17. Also, as shown in FIG. 6, a resist 8 which serves as a mask for selective etching of the trenches 5 is formed over each of the non-trenched surfaces 5a.

The above-described conventional trench forming process, however, has the following problems. The trenches 5 formed in the semiconductor substrate wafer 10 constitute a planar pattern which corresponds to devices to be formed. Therefore, if the ratio of the total area of the non-trenched surfaces 5a to the total area of the bottom surfaces 5b of the trenches 5 within the area irradiated by the coherent light 18 is extremely large, the amplitude of the variation in the intensity of zero order diffracted light with respect to the depth of the trench 5 is limited to a narrow range as shown in FIG. 7. In FIG. 7, $\lambda$ indicates the wavelength of the coherent light 18.

In addition, each of the trenches 5 has a slightly different cross-sectional shape in accordance with its size. Accordingly, if the trenches 5 having various sizes exist within the area irradiated by the coherent light 18, the curve which represents variations in the intensity of the zero order diffracted light with respect to the depth of the trenches 5 becomes a distorted curve rather than a sinusoidal curve.

Thus, since the resolution and S/N ratio of measurement are degraded, it has been impossible to measure the depth of the trenches 5 with high precision, resulting in a reduction in the working accuracy in trench formation.

SUMMARY OF THE INVENTION

It is, therefore, an object of the present invention to provide a process by which it is possible to form trenches in a semiconductor substrate wafer with high precision.

To achieve the above and other objects, in accordance with the present invention, there is provided a process for forming trenches in a semiconductor substrate wafer, comprising the steps of: forming a plurality of first trenches in a surface portion of the semiconductor substrate wafer; forming a plurality of depressions in a predetermined section of the surface portion simultaneously with the aforesaid step of forming the first trenches such that the ratio of the total area of the depressions to the total area of the portions between the depressions of the predetermined section may be a predetermined value, the predetermined section being defined at a location which does not interfere with the first trenches; and irradiating the predetermined region with measuring light to provide a measure of the depth of the depressions on the basis of the intensity of light reflected from the predetermined section, thereby obtaining the depth of the first trenches from the result of the measurement, whereby the first trenches having a predetermined depth are formed in the surface portion of the semiconductor substrate wafer.

The above and other objects and features of the invention will become apparent from the following detailed description of embodiments thereof taken in connection with the accompanying drawings.

DESCRIPTION OF THE PREFERRED EMBODIMENT

Figure 1:
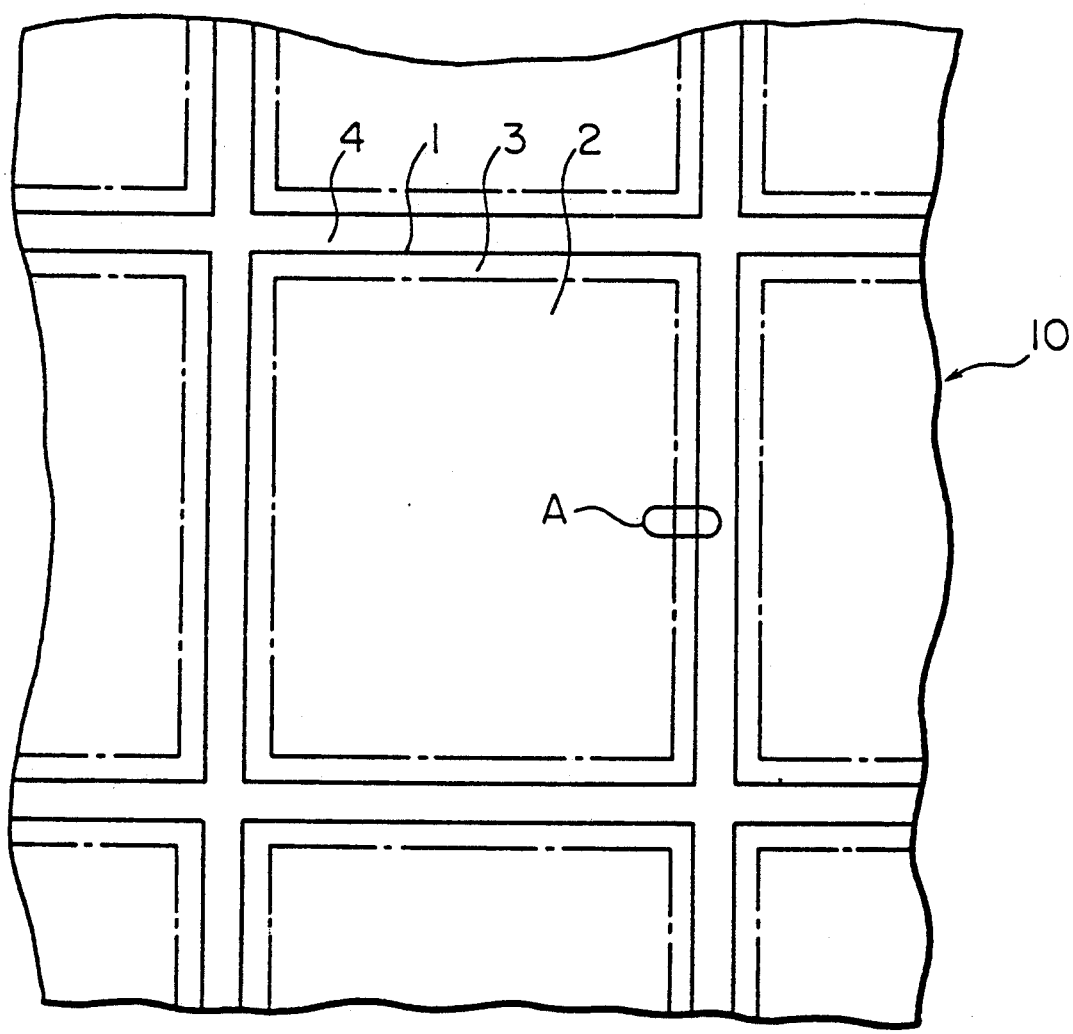
FIG. 1 is a diagrammatic top plan view of a portion of a semiconductor substrate wafer having trenches formed by a conventional trench-forming process.
Figure 2:
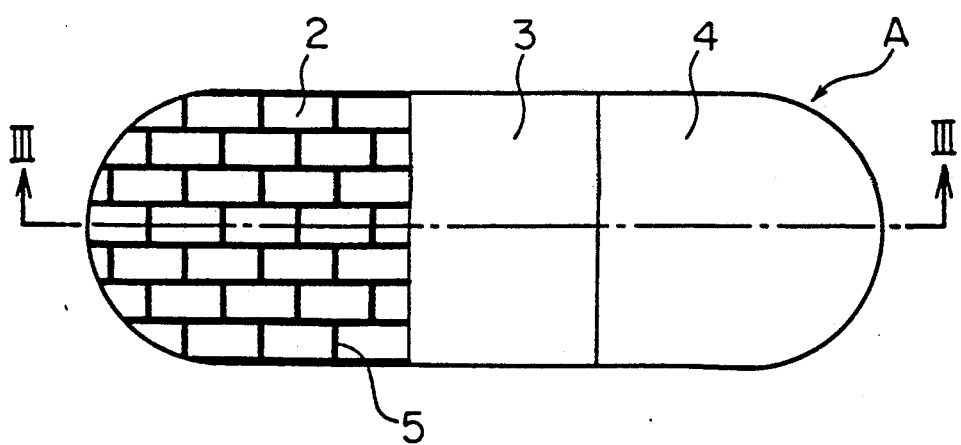
FIG. 2 is a partially enlarged top plan view of a portion A of FIG. 1.
Figure 3:
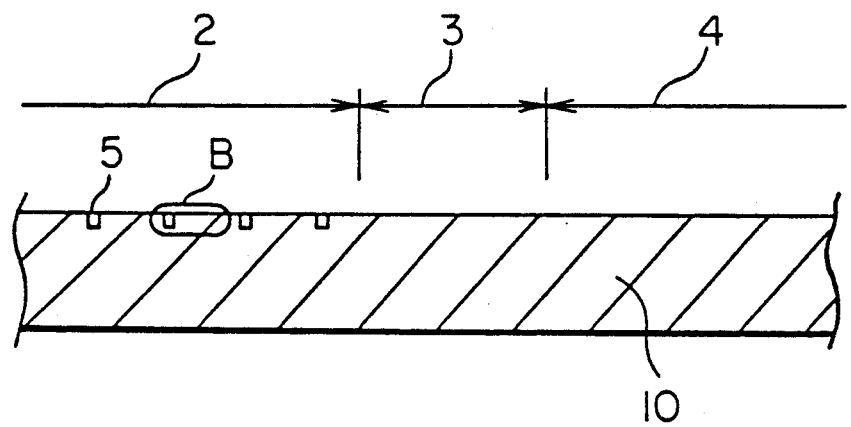
FIG. 3 is a cross-sectional view taken along the line III—III of FIG. 2.
Figure 4:
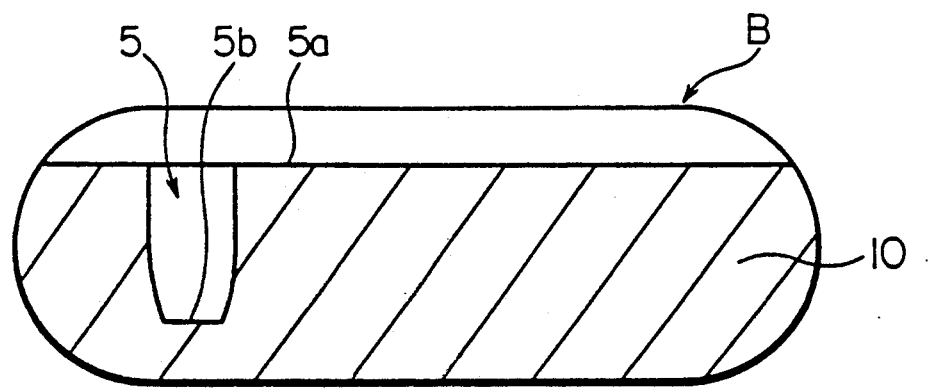
FIG. 4 is a partially enlarged view of a portion B of FIG. 3.

A preferred embodiment of the present invention will be described below with reference to the accompanying drawings in which like reference numerals are used to denote the like or corresponding elements referred to in the description of the related art.

Figure 8:
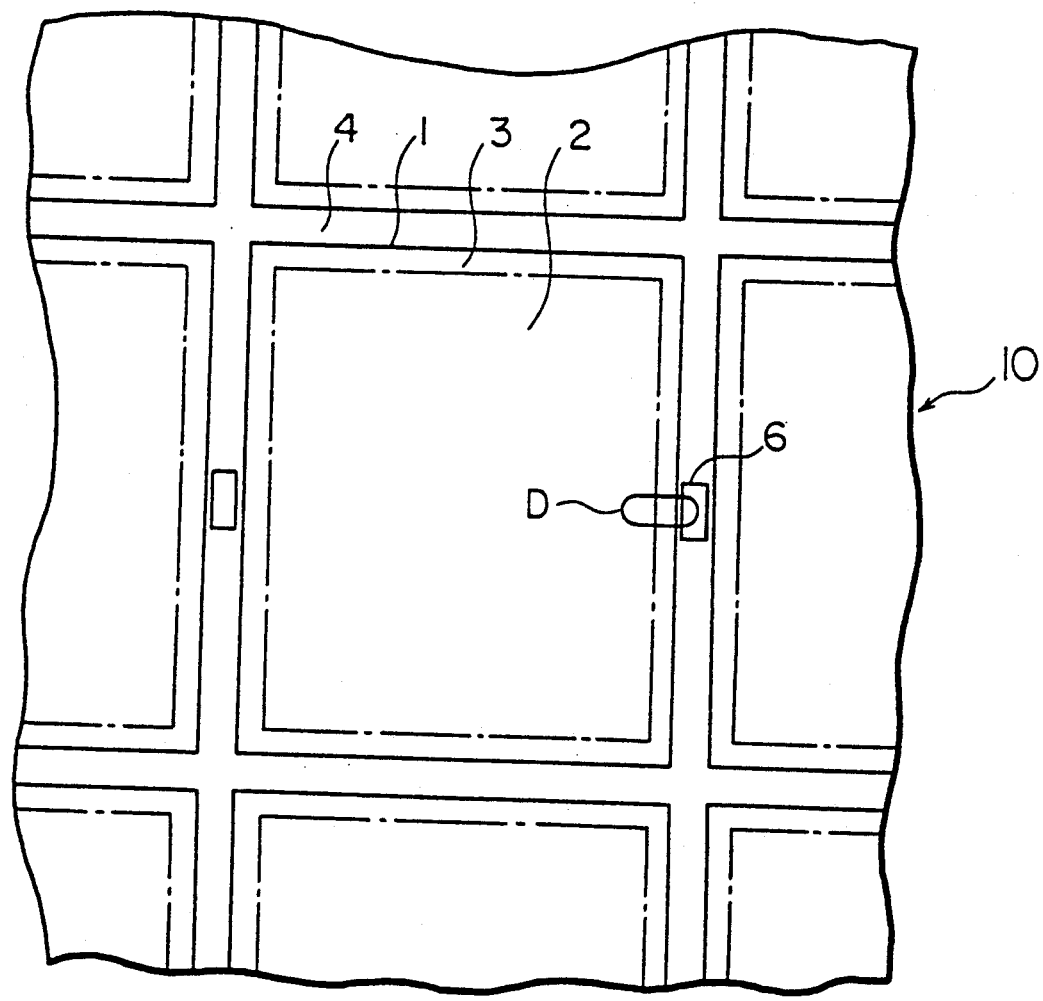
FIG. 8 is a diagrammatic top plan view of a portion of a semiconductor substrate wafer having first and second trenches formed by a process for forming trenches in a semiconductor substrate wafer according to one preferred embodiment of the present invention.

Referring to FIG. 8, a multiplicity of functional-pattern forming regions 1 which, in a subsequent step, will be cut into individual semiconductor chips are arranged on a semiconductor substrate wafer 10 in orderly fashion. Each of the functional-pattern forming regions 1 has a first-trench forming section 2 which is provided for the purpose of forming first trenches 5 required to form various kinds of devices and a marginal-pattern forming section 3 which is defined along the entire periphery of the first-trench forming section 2, so that electrodes and their associated elements may be formed thereon. The regions between adjacent functional-pattern forming regions 1 are called dicing lines 4. After various elements comprising a semiconductor chip have been formed in each of the functional-pattern forming regions 1, the semiconductor wafer 10 is cut into individual chips along the dicing lines 4.

Figure 9:
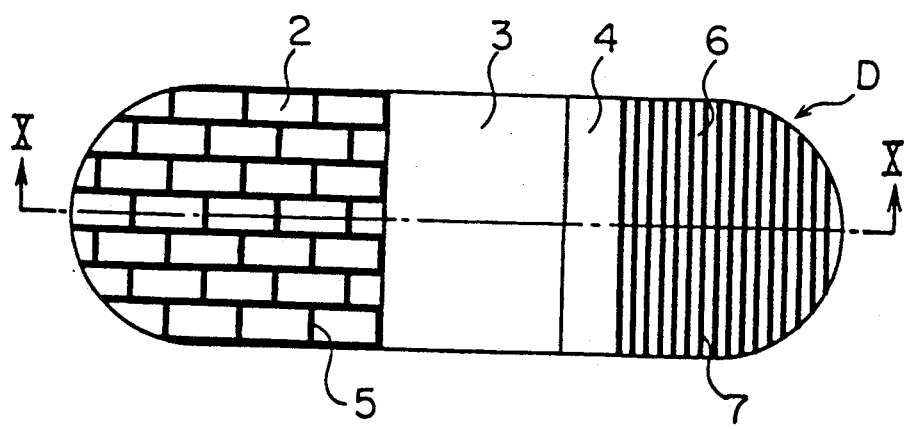
FIG. 9 is an enlarged view of a portion D of FIG. 8.
Figure 10:
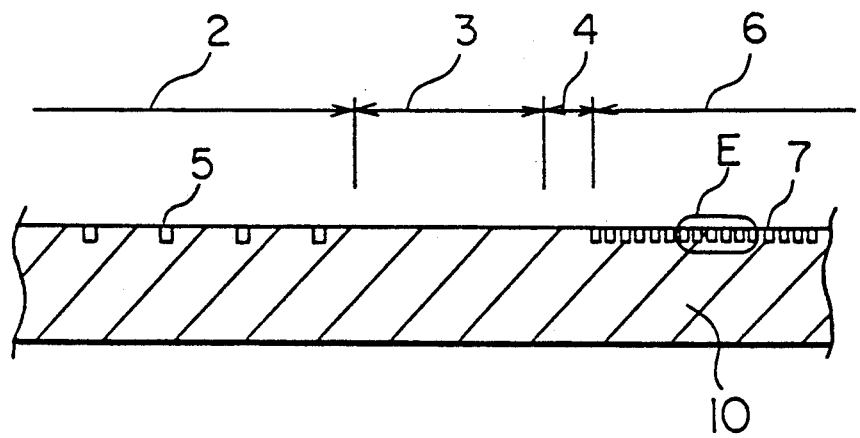
FIG. 10 is a cross-sectional view taken along the line X—X of FIG. 9.
Figure 11:
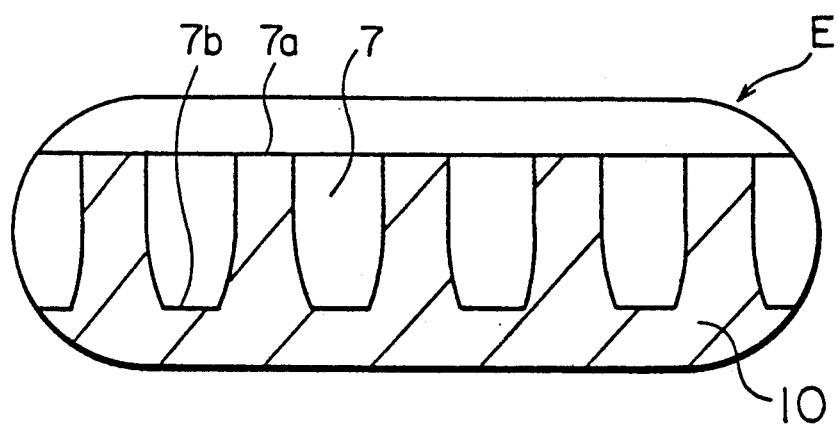
FIG. 11 is an enlarged view of a portion E of FIG. 10.

Also, a second-trench forming section 6 provided for the purpose of forming depressions 7 such as second trenches is formed at an appropriate position on each of the dicing lines 4. As shown in FIGS. 9 and 10, a plurality of first trenches 5 and a plurality of second trenches 7 are respectively formed in the first-trench forming section 2 and the second-trench forming section 6. The first trenches 5 constitute a planar pattern which corresponds to individual devices to be formed in the first-trench forming section 2. The second trenches 7 are, as shown in FIG. 11, arranged in the area 6 parallel to each other and having the same pitch. The ratio of the total area of non-trenched surfaces 7a of the portions between the trenches 7 to the total area of bottom surfaces 7b in the trenches 7 is selected to be a predetermined value, for example, one.

The above-described first and second trenches 5 and 7 are formed in the following manner by using an apparatus similar to the conventional apparatus shown in FIG. 5.

Figure 5:
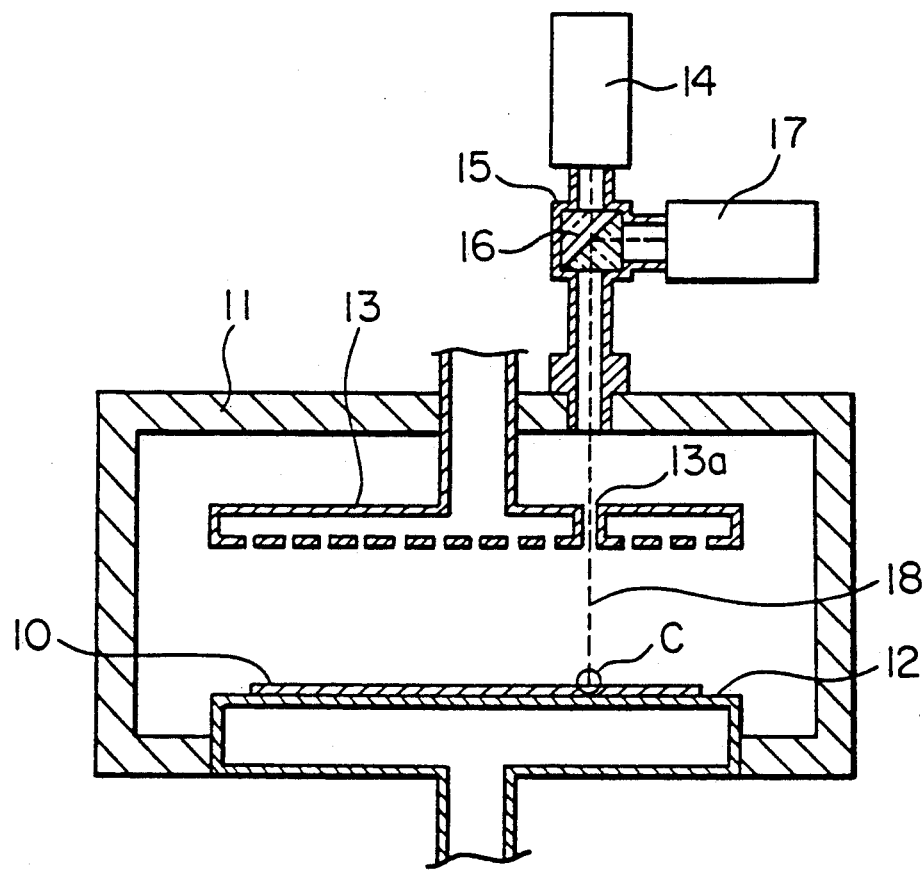
FIG. 5 is a diagrammatic cross-sectional view of a conventional type of apparatus for measuring the depth of trenches formed in a semiconductor substrate wafer.
Figure 6:
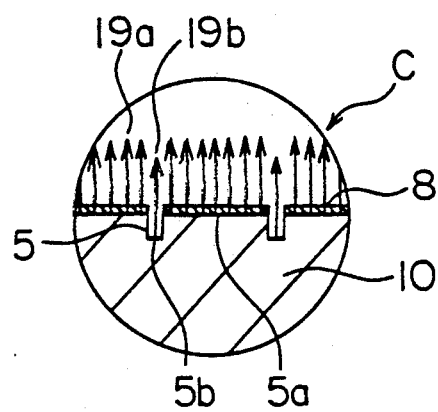
FIG. 6 is an enlarged view of a portion C of FIG. 5.
Figure 7:
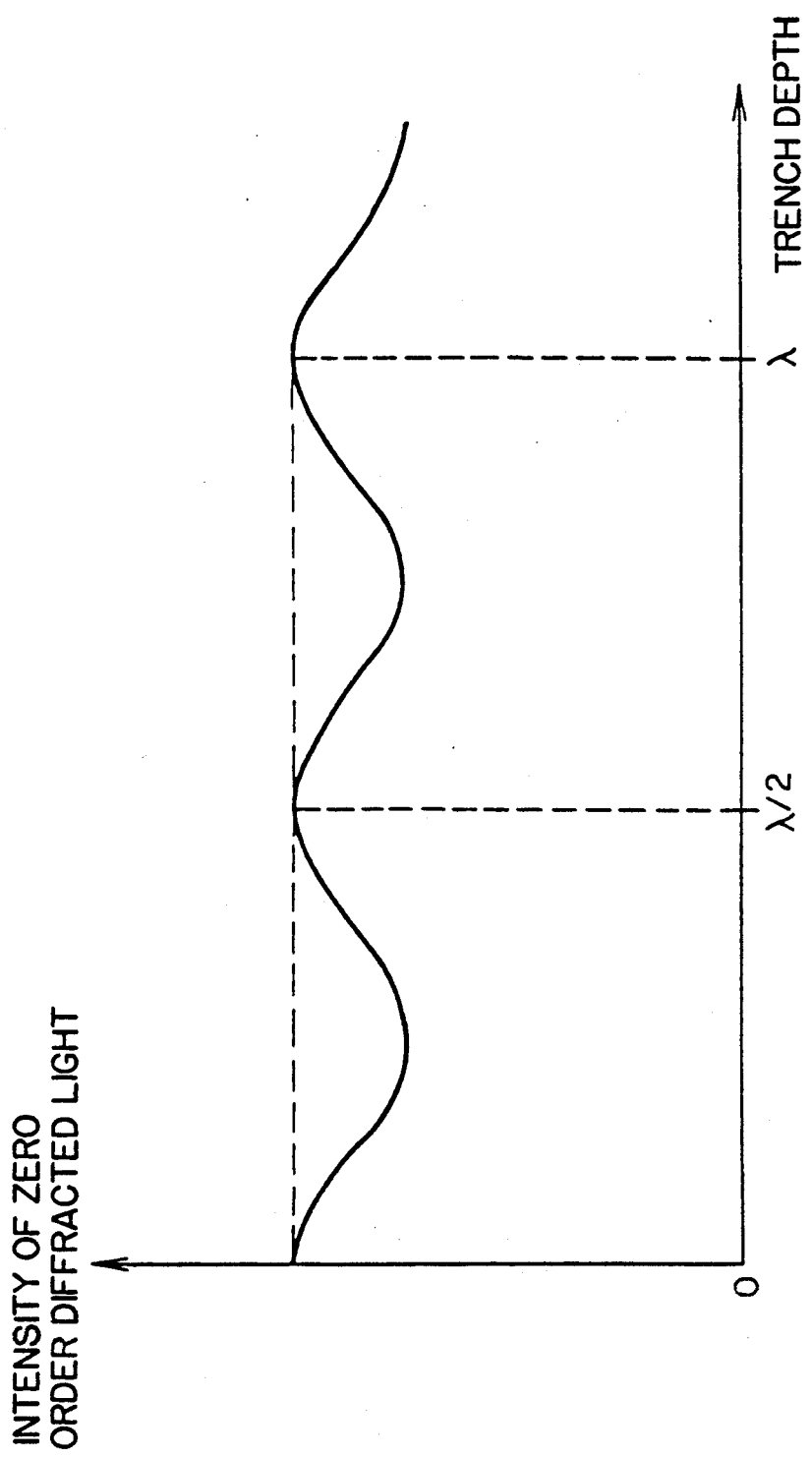
FIG. 7 is a waveform diagram showing variations in the quantity of zero order diffracted light resulting from a conventional trench-forming process.

In the apparatus shown in FIG. 5, the semiconductor substrate wafer 10 is carried on the lower electrode 12 disposed in the etching chamber 11. A resist 8 which serves as a mask for forming the first and second trenches 5 and 7 is patterned over a surface of the semiconductor substrate wafer 10.

Then, an etching gas is introduced into the etching chamber 11 and a predetermined level of voltage is applied across the upper electrode 13 and the lower electrode 12, thereby simultaneously forming the first trenches 5 and the second trenches 7 in the first-trench forming section 2 and the second-trench forming section 6, respectively, of the semiconductor substrate wafer 10. While the first and second trenches 5 and 7 are being formed, the coherent light 18 which passes through the through hole 13a in the upper electrode 13 irradiates the semiconductor substrate wafer 10 from a position above the etching chamber 11. At this time, the position of the semiconductor substrate wafer 10 is selected so that the coherent light 18 irradiates the second-trench forming section 6 on the semiconductor substrate wafer 10. The coherent light 18 is emitted from the light source 14 disposed at a position above the etching chamber 11 and is perpendicularly projected onto the semiconductor substrate wafer 10 via the spectroscopic prism 16 within the spectroscope 15.

Figure 12:
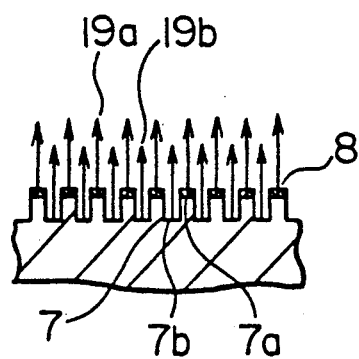
FIG. 12 is a cross-sectional view illustrating the state of measurement of the second trench.

Subsequently, the coherent light 18 is reflected by the illuminated portion of a surface of the semiconductor substrate wafer 10. However, since the second trenches 7 are formed in the surface portion of the second-trench forming section 6 of the semiconductor substrate wafer 10 as shown in FIG. 12, reflection of the coherent light 18 occurs on both the bottom surfaces 7b in the trenches 7 and the non-trenched surfaces 7a. More specifically, the light 19a reflected from the non-trenched surfaces 7a of the semiconductor substrate wafer 10 and the light 19b reflected from the bottom surfaces 7b in the trenches 7 interfere with each other to form zero order diffracted light. The zero order diffracted light is propagated in the upward direction and perpendicularly to the surface of the semiconductor substrate wafer 10. This zero diffracted-order light passes through the through hole 13a in the upper electrode 13 and is made incident upon the light receiver 17 via the spectroscopic prism 16 of the spectroscope 15. In FIG. 12, reference numeral 8 denotes a resist.

Figure 13:
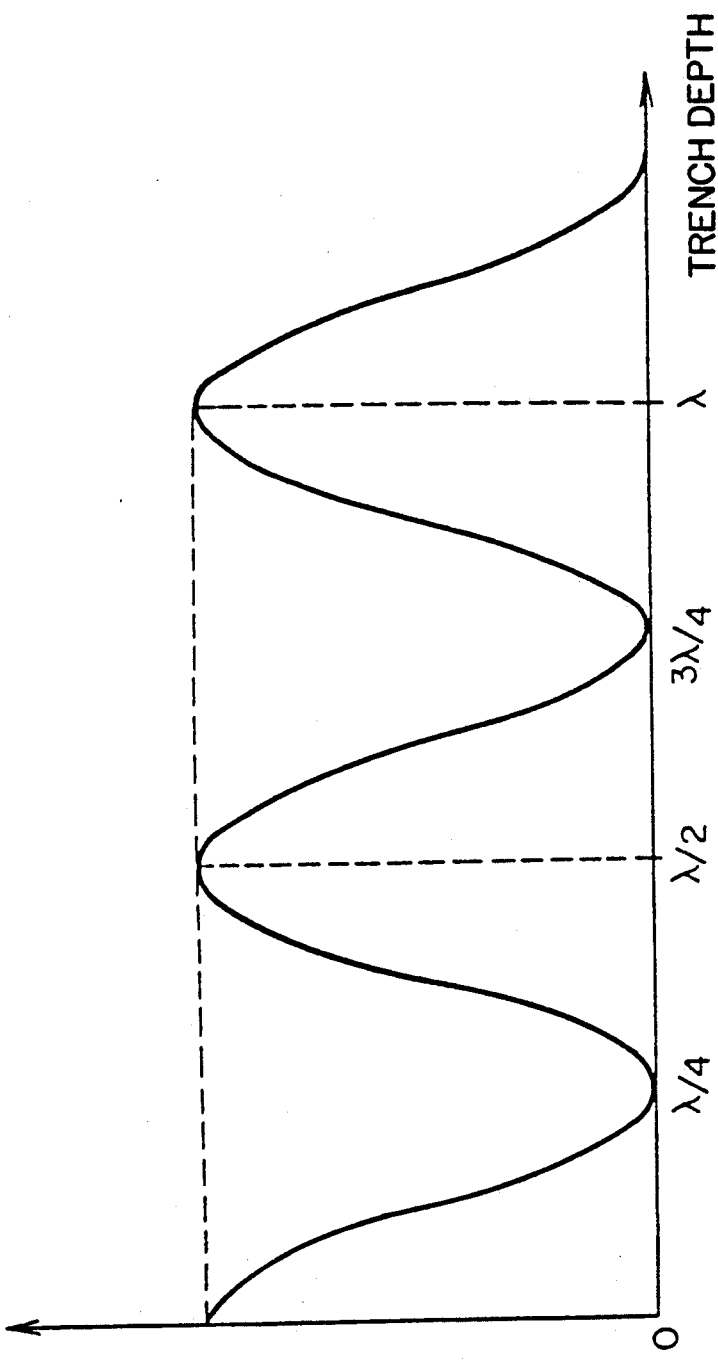
FIG. 13 is a waveform diagram showing variations in the quantity of zero order diffracted light obtained by the preferred embodiment of the present invention.

As described above, in the second-trench forming section 6 of the semiconductor substrate wafer 10, the ratio of the total area of the non-trenched surfaces 7a to the total area of the bottom surfaces 7b in the trenches 7 is set at 1. Therefore, in spite of the influence of the transmittance of the resist 8, the quantity of the reflected light 19a is substantially equal to the quantity of the reflected light 19b. Accordingly, the reflected light ray 19a and 19b interfere with each other so that the intensity of the zero order diffracted light incident upon the light receiver 17 varies greatly with the depth of the trenches 7 as shown in FIG. 13. Also, since the second trenches 7 are formed parallel to each other and having the same pitch, the variation of the intensity of the zero order diffracted light with respect to the depth of the trenches 7 draws a typical distortionless sinusoidal wave. It is possible, accordingly, to measure the depth of the second trenches 7 with high precision by measuring the intensity of the zero order diffracted light in the light receiver 17.

Also, since the first trenches 5 and the second trenches 7 are formed in the semiconductor substrate wafer 10 under identical conditions, the first trenches 5 are equal in depth to the second trenches 7. Accordingly, if the depth of the second trenches 7 is measured, the depth of the first trenches 5 can be obtained.

Subsequently, if the measured value of the depth of the second trenches 7 reaches a predetermined value, then it is determined that the depth of the first trench 5 has reached a point at which etching should be ended. The introduction of the etching gas into the etching chamber 11 and the application of a voltage across the upper and lower electrodes 13 and 12 are then stopped, and the etching of the semiconductor substrate wafer 10 ends.

It is to be noted that, in the second-trench forming section 6, the ratio of the total area of the non-trenched surfaces 7a to the total area of the bottom surfaces 7b in the respective trenches 7 is not limited to one. For example, if such a ratio is determined in the following manner, it is possible to further increase the amplitude of variation in the intensity of the zero order diffracted light with respect to the trench depth and hence to provide a depth measure which excels in both resolution and S/N ratio.

More specifically, if Ss represents the sum of the areas of the non-trenched surfaces 7a and St represents the sum of the areas of the bottom surfaces 7b in the trenches 7, the ratio St/Ss is determined from the following equation $$St/Ss = (1/At) \times [2a(Tr-1/K)As\sin\theta - Ar\sin\{\theta - 4\pi(Tr-1/K)/\lambda\}]$$

where
As: reflectance of the non-trenched surfaces 7a,
At: reflectance of the bottom surfaces 7b in the trenches 7,
Ar: reflectance of the resist 8,
$\alpha$: transmittance of the resist 8,
Tr: thickness of the resist 8,
l: depth to the bottoms of the etched trenches 7,
$\lambda$: wavelength of the coherent light 18, and
k: selection ratio (the ratio of the etch rate of the semiconductor substrate wafer 10 to that of the resist 8)

If the ratio St/Ss is determined by using the above-described equation, the quantity of the reflected light 19a from the non-trenched surfaces 7a can be made equal to the quantity of the reflected light 19b from the bottom surfaces 7b of the respective trenches 7. Accordingly, if the reflected light ray 19a and 19b cancel each other as a result of the mutual interference (trench depth = $\lambda/4$, $3\lambda/4$, etc.), the intensity of the zero order diffracted light becomes zero and therefore the amplitude of variations in the intensity of the zero order diffracted light with respect to the trench depth reaches a maximum.

Also, if the size of each of the second trenches 7 in top plan is made substantially the same as the smallest one of the first trenches 5, it is possible to accurately detect the depth of the finely formed trenches 5 and hence to improve the working accuracy of the depth of first trenches 5.

In the above-described embodiment, variations in the quantity of zero order diffracted light are measured, but such a measurement is not limited to the, zero diffracted-order light. For instance, higher order diffracted light such as a first or second order diffracted light may be detected to measure variations in its quantity. In this case, however, it is necessary to arrange the second trenches 7 at the same pitch in the second-trench forming section 6 illuminated by the coherent light 18.

In addition, each of the second-trench forming sections 6 may be formed at any location other than the dicing lines 4 which does not interfere with the first trenches 5 used for the purpose of forming various devices. For example, the second-trench forming section 6 may be formed in a portion of the functional-pattern forming region 1 which does not include the first trenches 5.

It will be appreciated from the foregoing that, if a plurality of holes each having a square or circular form in top plan are formed in place of the second trenches 7 each having a linearly extending form in plan view, it is possible to achieve similar effects.

What is claimed is:

1. A process for etching trenches of a desired depth in a semiconductor wafer comprising:

etching a first pattern of a plurality of spaced apart first trenches in a first portion of a surface of a semiconductor wafer;

etching a second pattern of a plurality of spaced apart second trenches in a second portion of said surface simultaneously with etching said first trenches, said second pattern including a first area, Ss, lying on the surface of said wafer and protected from etching by a mask and a second area, St, including the trenches, not lying on the surface of said wafer;

choosing the ratio of the second area, St, to the first area, Ss, so that $$St/SS = (1/At)[2\alpha As(Tr-l/k)\sin\Theta - Ar\sin(\Theta - (4\pi/\lambda)(Tr-l/k))]$$

where
As is the reflectance of the first area at a wavelength $\lambda$,
At is the the reflectance of the second area at the wavelength $\lambda$,
Ar is the reflectance of the mask disposed on the first area at the wavelength $\lambda$,
$\alpha$ is the transmittance of the mask at the wavelength $\lambda$, Tr is the thickness of the mask, l is the desired trench depth, k is the ratio of the etch rate of the wafer to the etch rate of the mask, and Θ is the phase of the light passing through the mask and reflected from the first area whereby a selected order of light diffracted from the first area periodically extinguishes the selected order of diffracted light from the second area as the trench depth increases, wherein the trenches are of constant pitch when the selected order is higher than o;

irradiating said second pattern with coherent light of a single wavelength λ;

measuring the depth of said second trenches from the sum of the intensities of light of a single wavelength λ diffracted from the second area and from the first area; and terminating the etching when the second trenches reach a desired depth as indicated by the sum of the intensities of the coherent light diffracted from the first and second areas Ss and St.

2. The process according to claim 1, wherein said second pattern includes rectilinear trenches arranged generally parallel to each other at a constant pitch.

3. The process according to claim 1, wherein said second trenches have a square cross-section at the surface of the wafer.

4. The process according to claim 1, wherein said second trenches have a circular cross-section at the surface of the wafer at said surface.

5. The process according to claim 1, including said first and second trenches dry etching.

6. The process according to claim 1 wherein the selected order of diffracted light is the zero order diffracted light.

7. The process according to claim 1 wherein the selected order of diffracted light is a higher order than the first order diffracted light.

8. The process according to claim 1 wherein said wafer includes dicing lines along which said wafer is to be severed further comprises the step of locating said second pattern on a dicing line of said semiconductor wafer.

9. The process according to claim 1 wherein said wafer includes dicing lines along which said wafer is to be severed further comprises the step of locating said second pattern outside a dicing line of said semiconductor wafer.

* * * * *

UNITED STATES PATENT AND TRADEMARK OFFICE
CERTIFICATE OF CORRECTION

PATENT NO. : 5,023,188

DATED : June 11, 1991

INVENTOR(S) : Hiroshi Tanaka

It is certified that error appears in the above-identified patent and that said Letters Patent is hereby corrected as shown below:

Column 6, line 57, change "St/SS" to --St/Ss--.

Column 8, line 6, change "surface of the wafer at said surface" to --surface of the wafer--.

Signed and Sealed this

Twelfth Day of January, 1993

Attest:

DOUGLAS B. COMER

Attesting Officer     Acting Commissioner of Patents and Trademarks